(12) United States Patent
Akahane (10) Patent No.: US 8,759,740 B2
(45) Date of Patent: Jun. 24, 2014

(54) SIGNAL PROCESSING SYSTEM FOR SOLID-STATE IMAGING DEVICE AND SOLID-STATE IMAGING DEVICE

(71) Applicant: Olympus Medical Systems Corp., Tokyo (JP)

(72) Inventor: Nana Akahane, Tokyo (JP)

(73) Assignee: Olympus Medical Systems Corp., Tokyo (JP)

( * ) Notice: Subject to any disclaimer, the term of this patent is extended or adjusted under 35 U.S.C. 154(b) by 0 days.

(21) Appl. No.: 13/959,001

(22) Filed: Aug. 5, 2013

(65) Prior Publication Data

US 2014/0034810 A1 Feb. 6, 2014

Related U.S. Application Data

(63) Continuation of application No. PCT/JP2012/081887, filed on Dec. 10, 2012.

(30) Foreign Application Priority Data

Mar. 13, 2012 (JP) ................................. 2012-055730

(51) Int. Cl.
*H01L 27/00* (2006.01)
*H04N 5/217* (2011.01)
*H04N 3/14* (2006.01)

(52) U.S. Cl.
USPC .................... 250/208.1; 348/241; 348/308

(58) Field of Classification Search
USPC ............................ 250/208.1; 348/241, 308
See application file for complete search history.

(56) References Cited

U.S. PATENT DOCUMENTS

| 6,166,769 | A | 12/2000 | Yonemoto et al. |
| 6,483,541 | B1 * | 11/2002 | Yonemoto et al. ............ 348/302 |
| 2005/0270393 | A1 | 12/2005 | Noda et al. |
| 2006/0044440 | A1 | 3/2006 | Park et al. |

FOREIGN PATENT DOCUMENTS

| JP | 5-227489 A | 9/1993 |
| JP | 9-46597 A | 2/1997 |
| JP | 10-13746 A | 1/1998 |
| JP | 2000-4399 A | 1/2000 |
| JP | 2000-41188 A | 2/2000 |
| JP | 2005-348042 A | 12/2005 |
| JP | 2006-74783 A | 3/2006 |

OTHER PUBLICATIONS

International Search Report dated Jan. 15, 2013 from corresponding International Application No. PCT/JP/2012/081887.

* cited by examiner

*Primary Examiner* — Thanh Luu
(74) *Attorney, Agent, or Firm* — Scully, Scott, Murphy & Presser, P.C.

(57) ABSTRACT

Provided is a solid-state imaging device that includes capacitors in a number greater than a unit read-out number that are connected to a plurality of pixels via transfer lines, and that performs a step of transferring to and retaining in separate capacitors from each other a noise signal output from the pixels in a number corresponding to the unit read-out number; and a step of repeating, for as many times as the unit read-out number, by switching the pixels and the capacitors, an operation in which a signal-plus-noise signal output from one of the pixels is transferred to and retained in one of the other capacitors, and the noise signal and the signal-plus-noise signal that have been output from the same pixel and retained in separate capacitors are subsequently output at the same time.

6 Claims, 11 Drawing Sheets

SIGNAL PROCESSING SYSTEM FOR SOLID-STATE IMAGING DEVICE AND SOLID-STATE IMAGING DEVICE

CROSS-REFERENCE TO RELATED APPLICATIONS

This is a continuation of International Application PCT/JP2012/081887, with an international filing date of Dec. 10, 2012, which is hereby incorporated by reference herein in its entirety. This application claims the benefit of Japanese Patent Application No. 2012-055730, filed on Mar. 13, 2012, the content of which is incorporated herein by reference.

TECHNICAL FIELD

The present invention relates to a signal processing system for a solid-state imaging device and to a solid-state imaging device.

BACKGROUND ART

In the related art, as represented by a CMOS (complementary metal-oxide semiconductor) image sensor, there is a known amplification-type solid-state imaging device in which photoelectric conversion elements output accumulated signal charges to signal lines after converting them to signal voltages in pixels (for example, see Patent Literature 1). In this solid-state imaging device, all vertical signal lines are provided with two capacitors that allow voltages generated when resetting charge-voltage conversion devices in the pixels (hereinafter, referred to as noise voltages) and voltages in which signal charges generated due to the photoelectric conversion are added to the noise voltages (hereinafter, referred to as signal-plus-noise voltage) to be output from the charge-voltage conversion devices in the pixels so as to be separately retained.

Then, this solid-state imaging device is configured such that the noise voltages and the signal-plus-noise voltages from all pixels in a row selected by a vertical-shift register are retained in the capacitors, after which the noise voltage and the signal-plus-noise voltage are output from the two capacitors provided in a column selected by a horizontal-shift register, and the difference between these voltages is calculated to perform noise removal.

CITATION LIST

Patent Literature

{PTL 1} Japanese Unexamined Patent Application, Publication No. 2000-4399

SUMMARY OF INVENTION

A first aspect of the present invention is a solid-state-imaging device signal processing system that is connected to a pixel-array portion in which, among a plurality of two-dimensionally arranged pixel units that include photoelectric conversion elements that photoelectrically convert incident light and charge-voltage conversion elements that convert photoelectrically converted signal charges to voltages and that can separately output noise signals generated when resetting the charge-voltage conversion elements and signal-plus-noise signals in which signals generated due to the photoelectric conversion are added to the noise signals, a plurality of pixel groups are formed of one or more of the pixel units and respectively have shared connections to a plurality of first transfer lines that individually are connected in parallel to a second transfer line via first switches, and from which the noise signals and the signal-plus-noise signals are output in an alternating manner, each in a unit read-out number, via the second transfer line, the solid-state-imaging device signal processing system including capacitors that are connected in parallel to the second transfer line and that are provided in a greater number than the unit read-out number; second switches that are provided between the respective capacitors and the second transfer line; third switches that selectively and simultaneously output signals retained in two capacitors among the individual capacitors; and a control portion that controls the second and third switches, wherein, in a specified read-out group formed of pixel groups in a number corresponding to the unit read-out number, the control portion performs a first step of repeating, for as many times as the unit read-out number, by switching the pixel groups and the capacitors, an operation in which the second switches are controlled so that noise signals output to the second transfer line from one of the pixel units in the pixel groups are transferred to and retained in one of the capacitors; and a second step of repeating, for as many times as the unit read-out number, by switching the pixel groups and the capacitors, an operation in which the second switches are controlled so that signal-plus-noise signals output to the second transfer line from one of the pixel units in the pixel groups are transferred to and retained in another one of the capacitors and in which the third switches are subsequently controlled so that one noise signal and one signal-plus-noise signal that have been output from the same pixel unit and retained in separate capacitors are output at the same time.

Another aspect of the present invention is a solid-state imaging device including the solid-state-imaging device signal processing system described above; and the pixel-array portion that is connected to the solid-state-imaging device signal processing system, wherein the pixel-array portion is provided with a plurality of two-dimensionally arranged pixel units that include photoelectric conversion elements that photoelectrically convert incident light and charge-voltage conversion elements that convert photoelectrically converted signal charges to voltages and that can separately output noise signals generated when resetting the charge-voltage conversion elements and signal-plus-noise signals in which signals generated due to the photoelectric conversion are added to the noise signals; the plurality of first transfer lines whose connections thereto are shared among the plurality of pixel groups formed of one or more of the pixel units; the first switches provided in the respective first transfer lines; and the second transfer line to which the respective first transfer lines are connected in parallel via the first switches.

BRIEF DESCRIPTION OF DRAWINGS

FIG. 11 (a) to (d) are diagrams for explaining input and output of the noise voltage and the signal-plus-noise voltage to and from the capacitor during time $t_1$ to $t_4$ in the timing chart in FIG. 10.

DESCRIPTION OF EMBODIMENT

A solid-state imaging device 1 according to an embodiment of the present invention will be described below with reference to the drawings.

Figure 1:
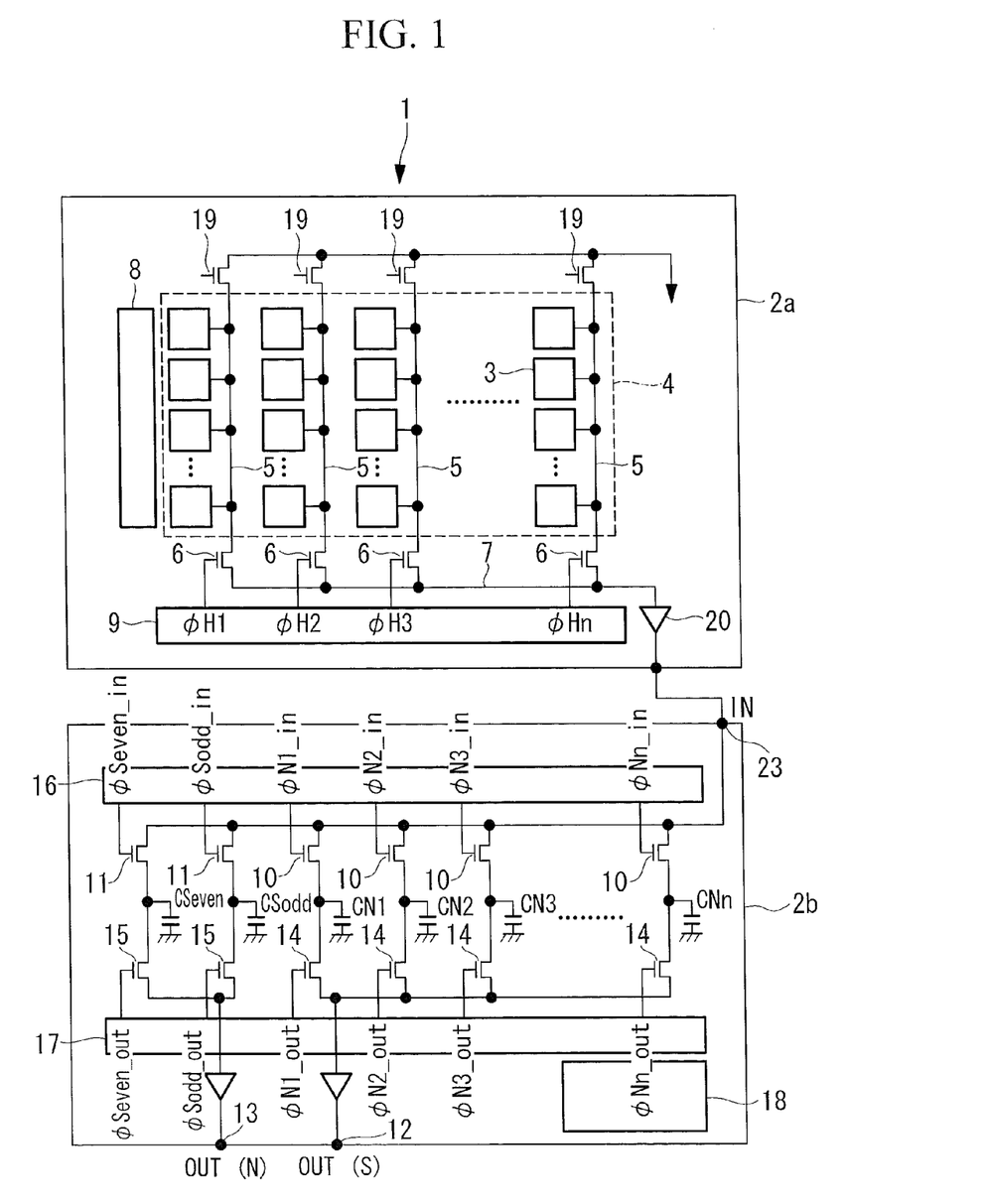
FIG. 1 is a plan view showing the configuration of a solid-state imaging device according to an embodiment of the present invention.

The solid-state imaging device 1 according to this embodiment is an apparatus installed in an image-acquisition device such as an endoscope, a digital camera, and so forth, and, as shown in FIG. 1, circuits provided in the solid-state imaging device 1 are constituted of two circuit blocks 2a and 2b.

The first circuit block 2a is constituted of a pixel array and a scanning portion. Specifically, the first circuit block 2a is provided with a pixel array 4 including pixels (pixel units, pixel groups) 3 having a square arrangement of m rows by n columns, vertical signal lines (first transfer lines) 5 to which the pixels 3 belonging to the same columns are commonly connected, column-selecting transistors (first switches) 6 provided in the respective vertical signal lines 5, and a horizontal signal line (second transfer line) 7 to which the vertical signal lines 5 are commonly connected in parallel via the column-selecting transistors 6. In addition, the first circuit block 2a is provided with a scanning portion including a first scanning portion 8 for selecting a row from the pixel array 4 and outputting voltages from the pixels 3 in the selected row to the vertical signal lines 5, and a second scanning portion 9 for selecting a vertical signal line 5 and outputting the voltages from the selected vertical signal line 5 to the horizontal signal line 7. This circuit block 2a may be configured so that currents from the pixels 3 are output to the horizontal signal line 7, and so that the currents are output after being converted to voltages by a current-voltage conversion element (not shown) provided in the horizontal signal line 7.

The second circuit block 2b is constituted of a noise-removal circuit. Specifically, the second circuit block 2b is provided with a plurality of capacitors CSeven, CSodd, and CN1 to CNn (hereinafter, these capacitors are also collectively referred to as capacitors C) that are connected in parallel to the horizontal signal line 7, input transistors (second switches) 10 and 11 provided between the respective capacitors C and the horizontal signal line 7, and output transistors (third switches) 14 and 15 provided between the respective capacitors C and output terminals 12 and 13. In addition, the second circuit block 2b is provided with a third scanning portion 16 for selecting the capacitors C to which the voltages from the horizontal signal line 7 are input, a fourth scanning portion 17 for selecting the capacitors C from which the voltages are output, and a control circuit (control portion) 18 that controls the operation of the first to fourth scanning portions 8, 9, 16, and 17. A signal processing system for the solid-state imaging device according to the present invention corresponds to the circuit block 2b.

Figure 2:
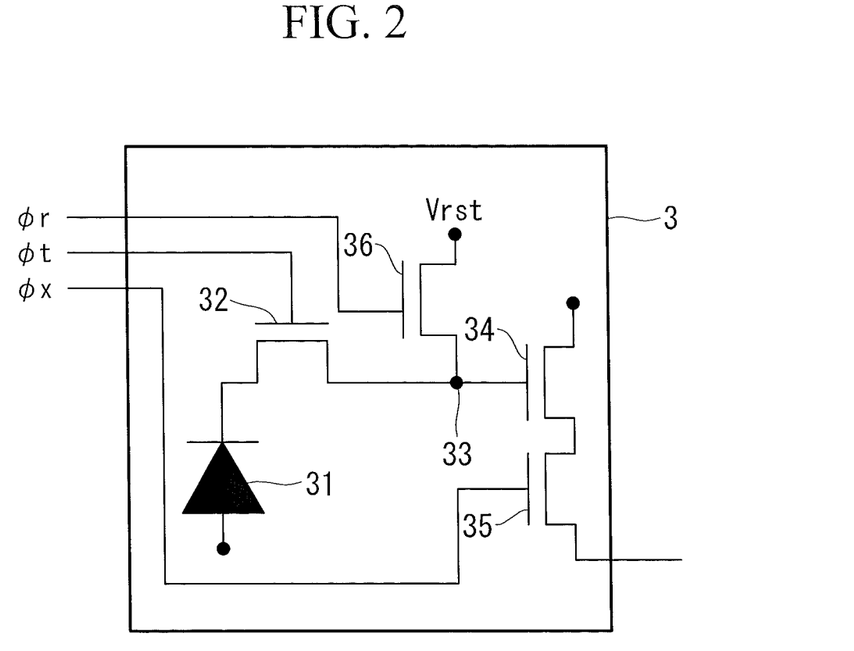
FIG. 2 is a plan view showing the configuration of a pixel provided in the solid-state imaging device in FIG. 1.

FIG. 2 shows an example circuit configuration of the individual pixels 3. As shown in FIG. 2, a pixel 3 is provided with a photodiode (PD, photoelectric conversion element) 31 that photoelectrically converts received optical signals and accumulates signal charges, a transfer transistor (transfer portion) 32 that transfers the signal charges accumulated in the PD 31, a floating diffusion (FD, charge-voltage conversion element) 33 that accumulates the signal charges transferred thereto from the transfer transistor 32, an amplifying transistor 34 that reads out the signal charges accumulated in the FD 33 as voltages, a pixel-selecting transistor 35 that is connected between the amplifying transistor 34 and the vertical signal line 5, and a resetting transistor 36 that resets the voltages in the FD 33 to a reset voltage Vrst.

The pixel 3 is driven by receiving pulses φt, φx, and φr from the first scanning portion 8 as inputs to the respective transistors 32, 35, and 36, which are operated as switches. Specifically, first, upon receiving the input pulse pt at the transfer transistor 32, the signal charge that has been accumulated in the PD 31 is transferred to the FD 33. The FD 33 accumulates the signal charge transferred thereto, thereby generating a signal voltage in accordance with the amount of that signal charge. Next, upon receiving the input pulse Tx at the pixel-selecting transistor 35, the signal voltage generated at the FD 33 is output to the vertical signal line 5 via the amplifying transistor 34. Upon receiving the input pulse φr at the resetting transistor 36, the voltage in the FD 33 is reset to the reset voltage Vrst.

Here, in the pixel 3, the pulse φx is input to the pixel-selecting transistor 35 immediately after the pulse φr is input to the resetting transistor 36. Accordingly, the pixel 3 outputs to the vertical signal line 5 a voltage that does not contain the signal voltage in the PD 31, that is to say, a noise voltage (noise signal) retained in the FD 33 associated with the resetting operation of the resetting transistor 36. Subsequently, in the pixel 3, the pulses φt and φx are input to the transfer transistor 32 and the pixel-selecting transistor 35. Accordingly, the pixel 3 outputs to the vertical signal line 5 the signal-plus-noise voltage (signal-plus-noise signal), in which the signal voltage is superimposed on the noise voltage.

Reference sign 19 indicates constant-current-circuit elements that supply constant currents to the vertical signal lines 5. In the state in which the constant-current-circuit elements 19 are supplying the constant currents to the respective vertical signal lines 5, the second scanning portion 9 sequentially inputs pulses to the column-selecting transistors 6 starting from the column-selecting transistor 6 of a first column to the column-selecting transistor 6 of an $n^{th}$ column, and thus, voltages are output to the horizontal signal line 7 from the respective vertical signal lines 5. The voltages output to the horizontal signal line 7 are transferred to the second circuit block 2b via an amplified-signal outputting circuit 20.

The capacitors include as many noise capacitors CN1 to CNn as the number of columns in the pixel array 4 (unit read-out number), as well as two signal capacitors CSeven and CSodd. Hereinafter, input transistors 10 and output transistors 14 connected to the noise capacitors CN1 to CNn will be referred to as noise-inputting transistors and noise-outputting transistors, respectively, and input transistors 11 and output transistors 15 connected to the signal capacitors CSeven and CSodd will be referred to as signal-inputting transistors and signal-outputting transistors, respectively. The noise capacitors CN1 to CNn are connected in parallel to the first output terminal 12 via the noise-outputting transistors 14. The signal capacitors CSeven and CSodd are connected in parallel to the second output terminal 13 via the signal-outputting transistors 15.

The control circuit 18 controls the operation of reading out the voltages from the pixel array 4 by outputting to the first to fourth scanning portions 8, 9, 16, and 17 control signals that cause the respective pulses to be output in accordance with a pulse sequence that is set in advance.

Next, the operation of the solid-state imaging device 1 by this control circuit 18 will be described with reference to a timing chart in FIG. 3.

The solid-state imaging device 1 according to this embodiment sequentially executes a first step of reading out the noise voltages from the pixels 3 and a second step of reading out the signal-plus-noise voltages from the pixels 3.

In the first step, the solid-state imaging device 1 selects the pixels 3 in the first row by means of the first scanning portion 8, and reads out the noise voltages from n pixels 3 (read-out group) in the selected first row to the vertical signal lines 5.

Next, the read-out noise voltages are transferred from the vertical signal lines 5 to the noise capacitors CN1 to CNn. Specifically, the second scanning portion 9 inputs a pulse φH1 to the column-selecting transistor 6 of the first column, and, at the same time, the third scanning portion 16 inputs a pulse φN1_in to the noise-inputting transistor 10 of the first column. By doing so, the noise voltage of the pixel 3 in the first column is retained in the noise capacitor CN1 in the first column. Similarly, the solid-state imaging device 1 retains the noise voltages from the pixels 3 in the second to $n^{th}$ columns in the noise capacitors CN2 to CNn in the second to $n^{th}$ columns, respectively.

Subsequently, in the second step, the solid-state imaging device 1 reads out the signal-plus-noise voltages from the n pixels 3 in the first row to the vertical signal lines 5.

Next, the read-out signal-plus-noise voltages are transferred from the vertical signal lines 5 to one of the signal capacitors CSeven and CSodd, and, in synchronization with this transfer, the signal-plus-noise voltages are output from the other one of the signal capacitors CSeven and CSodd. Specifically, first, the second scanning portion 9 inputs the pulse φH1 to the column-selecting transistor 6 of the first column, and, at the same time, the third scanning portion 16 inputs a pulse φSeven_in to the first signal-inputting transistor 11. Accordingly, the signal-plus-noise voltages read out to the horizontal signal line 7 from the vertical signal line 5 of the first column are transferred to the first signal capacitor CSeven.

Next, the second scanning portion 9 inputs a pulse φH2 to the column-selecting transistor 6 of the second column, and, at the same time, the third scanning portion 16 inputs a pulse φSodd_in to the second signal-inputting transistor 11. Accordingly, the signal-plus-noise voltages read out to the horizontal signal line 7 from the vertical signal line 5 of the second column are transferred to the second signal capacitor CSodd. At the same time as these pulses φH2 and φSodd_in are input, the fourth scanning portion 17 inputs a pulse φN1_out to the noise-outputting transistor 14 of the first column and also inputs a pulse φSeven_out to the first signal-outputting transistor 15. Accordingly, the noise voltage and the signal-plus-noise voltage read out from the pixel 3 in first row and first column are output from the first output terminal 12 and the second output terminal 13 at the same time.

In a similar manner, the solid-state imaging device 1 repeats the operation of retaining the signal-plus-noise voltages from pixels 3 in the $j^{th}$ column (j=3, 4, ... n) in the first signal capacitor CSeven/CSodd and outputting the signal-plus-noise voltages from pixels 3 in the j–$1^{th}$ column, which have been retained in the second signal capacitor CSodd/CSeven immediately before this, together with the noise voltages from those pixels 3.

After the noise voltages and the signal-plus-noise voltages from the pixels 3 in the first row of all columns are output from the capacitors CSodd, CSeven, and CN1 to CNn, the solid-state imaging device 1 repeats the same operation for the second row to the $m^{th}$ row. By doing so, the noise voltages and the signal-plus-noise voltages from all pixels 3 are output. The noise voltages and the signal-plus-noise voltages output from the same pixels 3 are processed by an external signal processing portion (not shown), and net signal voltages are calculated for the respective pixels 3 by subtracting the noise voltages from the signal-plus-noise voltages.

Figure 3:
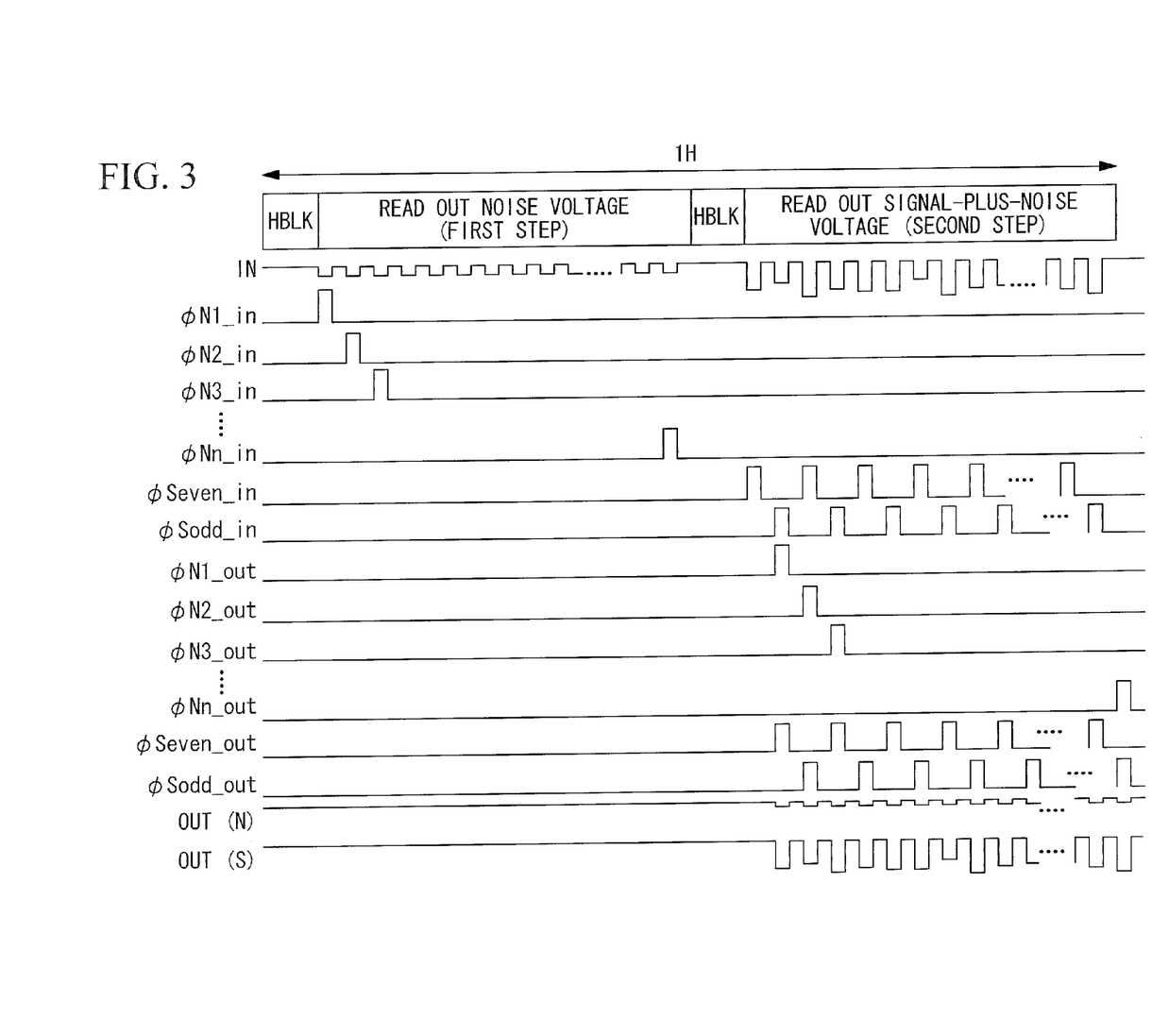
FIG. 3 is a timing chart showing the operation of the solid-state imaging device in FIG. 1.

Note that, in FIG. 3, IN indicates voltages at an input terminal 23 of the second circuit block 2b, to which the voltages from the horizontal signal line 7 are input, and OUT (N) and OUT (S) indicate the voltages at the first output terminal 12 and the second output terminal 13, respectively.

As described above, with this embodiment, in order to obtain the noise voltages and the signal-plus-noise voltages of the individual pixels 3, it suffices to have as many capacitors C as the number obtained by adding two to the number of columns of the pixels 3. Accordingly, it is possible to reduce the areas of the circuits as compared with a conventional solid-state imaging device provided with twice as many capacitors as the number of columns of the pixels 3. In particular, because the area that the capacitors occupy in the entire circuit is large in a conventional solid-state imaging device, reducing the number of capacitors is effective in achieving size reduction of the solid-state imaging device 1 as a whole.

Furthermore, the first circuit block 2a constituted of the pixel array and the scanning portion and the second circuit block 2b constituted of the noise-removal circuit can be formed on different chips; the chip including the second circuit block 2b can be disposed on the back side of the chip including the first circuit block 2a; and thus, overall, the projected area as viewed from the front side can be reduced.

Note that, in this embodiment, although the noise voltages read out from the pixels 3 are retained in the noise capacitors CN1 to CNn in the columns corresponding to the columns of those pixels 3, alternatively, the noise voltages may be retained in the noise capacitors CN1 to CNn of arbitrary columns. In this case, for example, the control circuit 18 should store the correspondence between the columns including the pixels 3 and the columns including the noise capacitors CN1 to CNn that retain the noise voltages from those pixels 3.

In addition, in this embodiment, although the two signal capacitors CSeven and CSodd are provided, it suffices to include at least one signal capacitor. In the case in which only one signal capacitor is provided, the operating speed is reduced as compared with the above-described embodiment because inputting of the signal-plus-noise voltages to the capacitors and outputting of the signal-plus-noise voltages from the capacitors, performed in the respective steps, must be sequentially executed by in a time-division manner; however, it is possible to achieve even greater size reduction as compared with the solid-state imaging device 1 described above.

Figure 4:
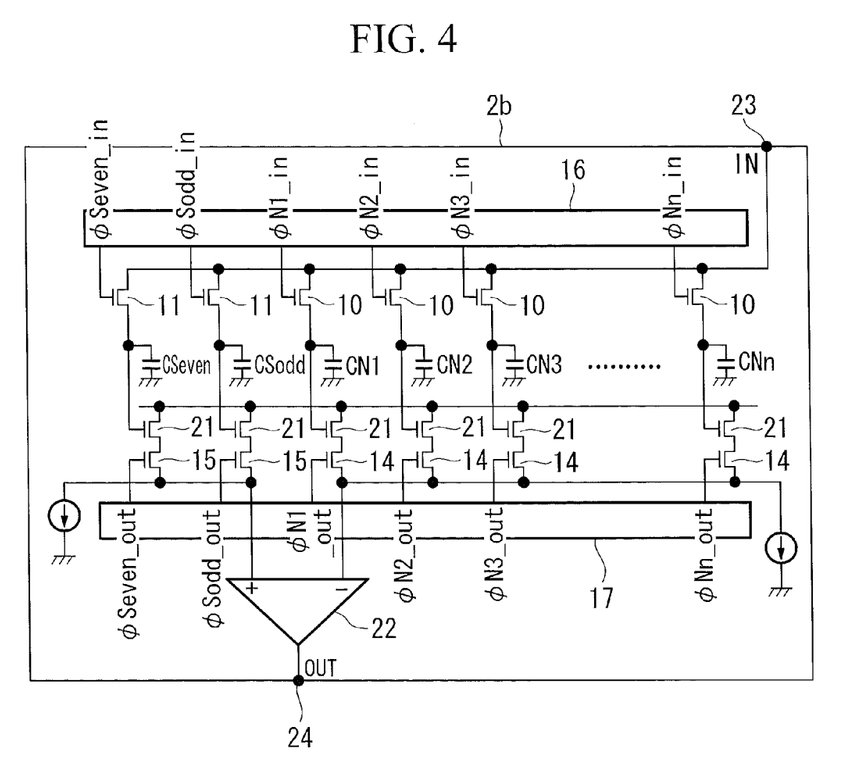
FIG. 4 is a plan view showing a partial configuration of a modification of the solid-state imaging device in FIG. 1, in which a noise-outputting transistor and a signal-outputting transistor form a source follower.

In addition, in this embodiment, the individual output transistors 14 and 15 may be configured so as to form source followers. Specifically, as shown in FIG. 4, current amplifying transistors 21 that are connected between the individual output transistors 14 and 15 and the individual capacitors C are provided. The drains of these current amplifying transistors 21 are connected to a power-supply voltage. When pulses φSeven_out, φSodd_out, and φNj_out are input to the respective output transistors 14 and 15, the voltages retained in the respective capacitors C, which are gate voltages of the current amplifying transistors 21, are output through the drains of the respective output transistors 14 and 15 without being subjected to capacitance division. Note that the control circuit 18 is omitted from the illustration in FIG. 4.

Figure 5:
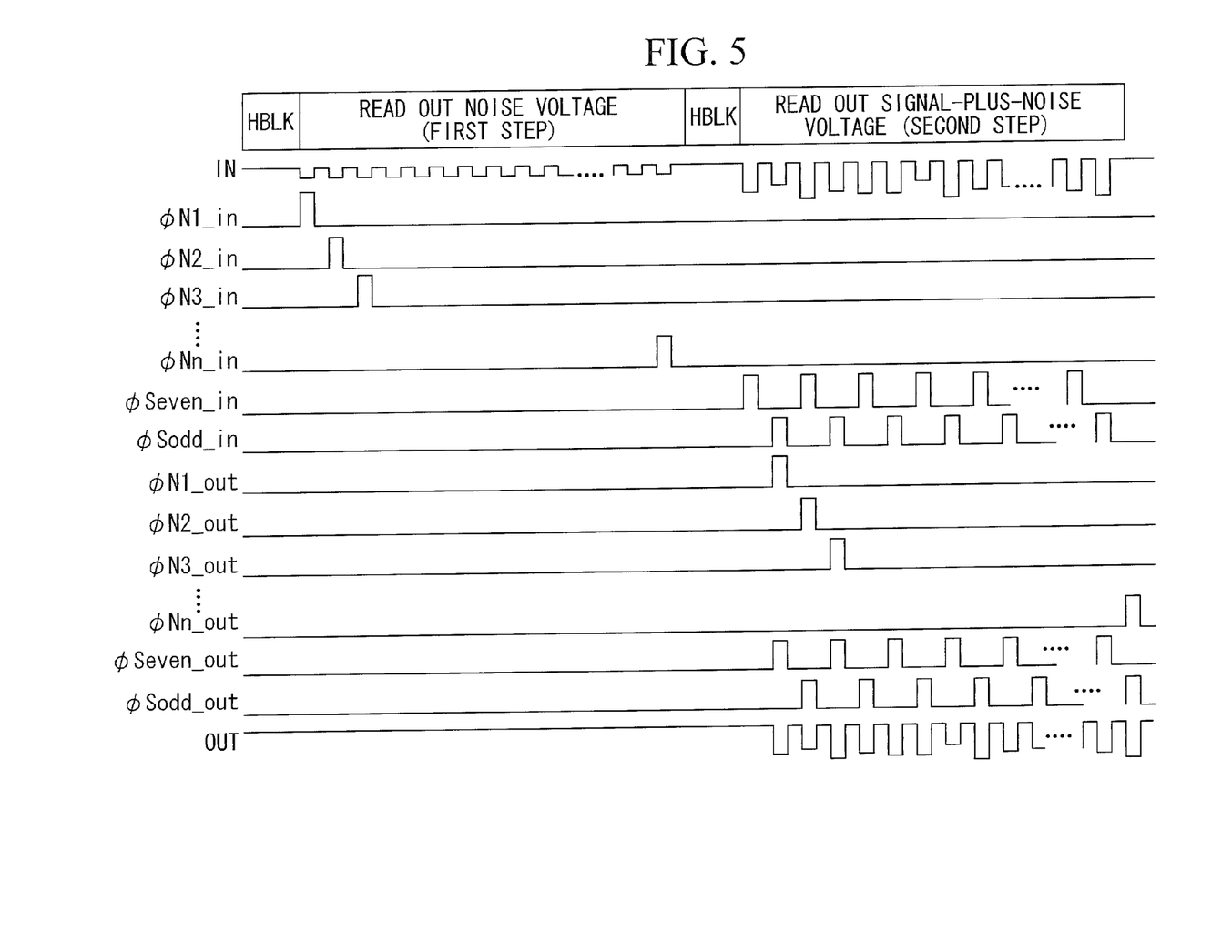
FIG. 5 is a timing chart showing the operation of the solid-state imaging device according to the modification in FIG. 4.

In the modification shown in FIG. 4, terminals corresponding to the first output terminal 12 and the second output terminal 13 are input terminals of a differential amplifier 22. The differential amplifier 22 outputs the differences obtained by subtracting the noise voltages from the signal-plus-noise voltages after amplifying them. FIG. 5 is a timing chart showing the operation of the solid-state imaging device according to this modification. In FIG. 5, OUT indicates the voltage at an output terminal 24, indicating the output of the differential amplifier 22.

By doing so, voltages retained in the respective capacitors C are input to the differential amplifier 22 without losing gain due to the capacitance division, and thus, the voltages are output in the state resulting from performing noise subtraction in the chip 2b. Accordingly, it is possible to obtain signals having a high S/N ratio.

Figure 6:
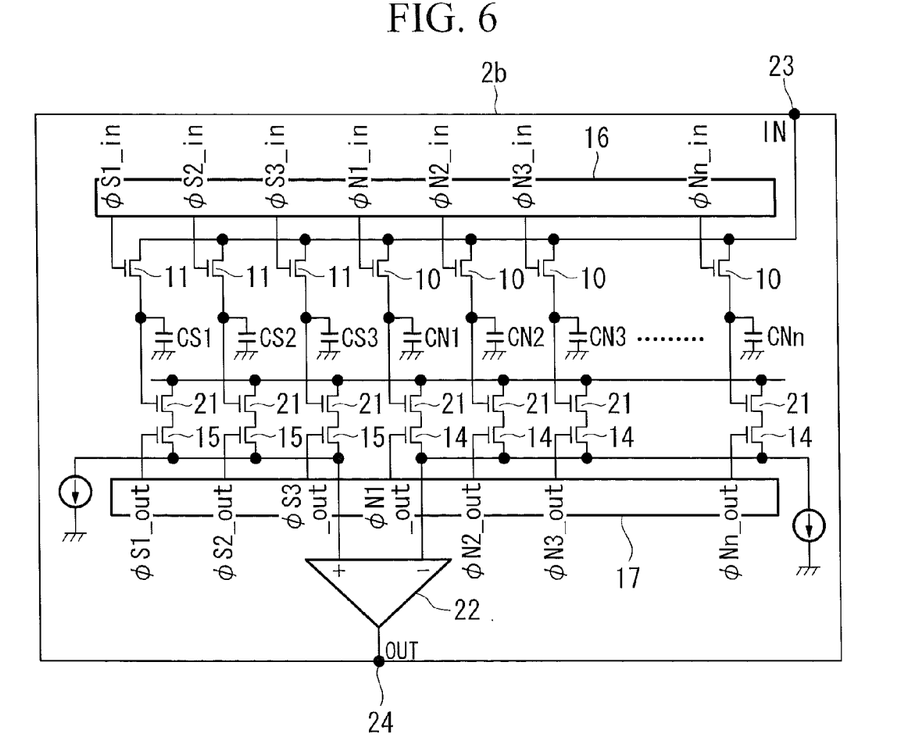
FIG. 6 is a plan view showing a partial configuration of a modification of the solid-state imaging device in FIG. 1, which is provided with three signal capacitors.
Figure 7:
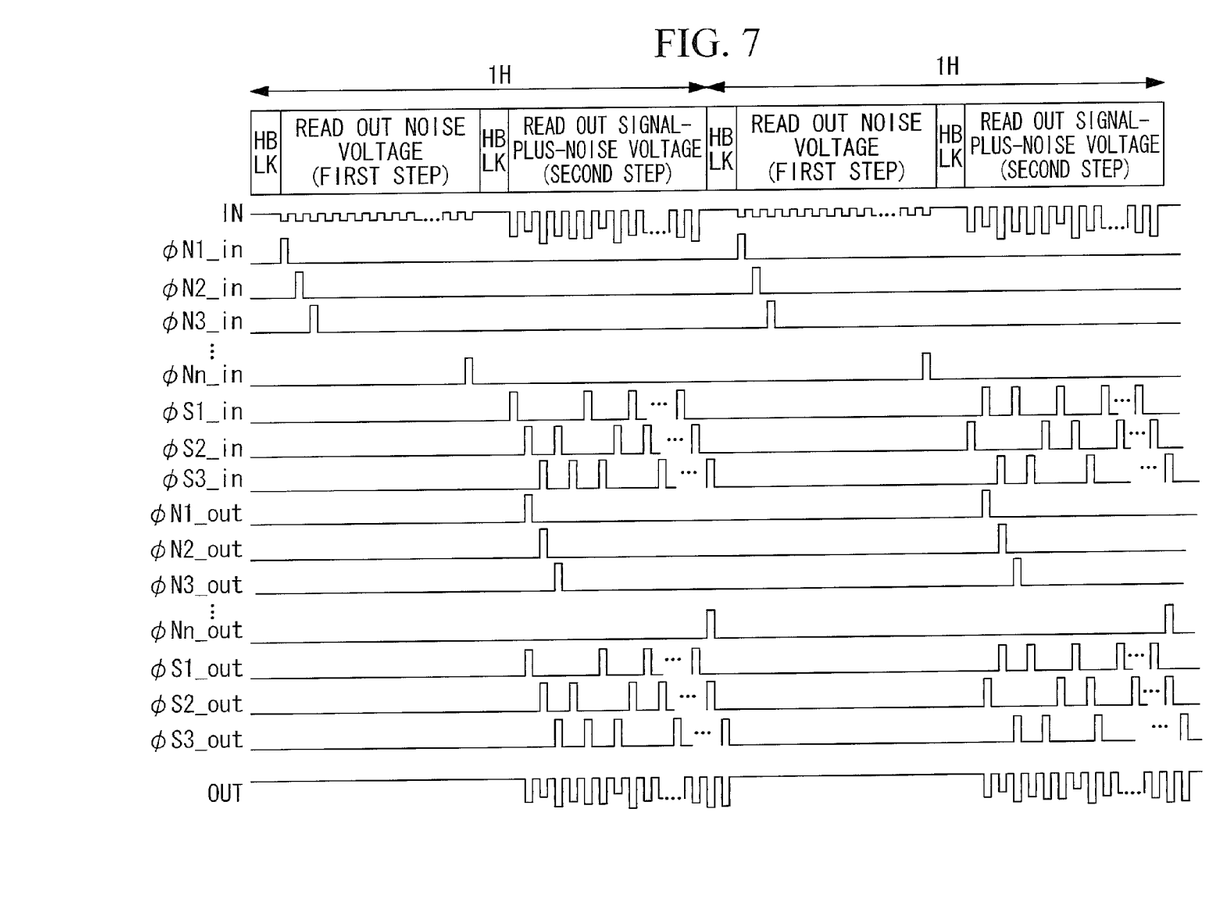
FIG. 7 is a timing chart showing the operation of the solid-state imaging device according to the modification in FIG. 6.

In addition, in this embodiment, although the two signal capacitors CSeven and CSodd are provided, alternatively, three or more signal capacitors may be provided. FIG. 6 shows a configuration provided with three signal capacitors CS1 to CS3. The thus-configured solid-state imaging device according to this modification can be operated as shown in FIG. 7. Specifically, the signal-plus-noise voltages read out from the pixels 3 are randomly retained in the signal capacitors CS1 to CS3 in an irregular order instead of retaining them in the signal capacitors CS1 to CS3 in a regular order. Note that the control circuit 18 is omitted from the illustration in FIG. 6.

In the case in which the signal capacitors CS1 to CS3 are used in a regular order, fixed-pattern noise in the form of longitudinal stripes appears in an image due to variability among the retaining circuits of the respective columns including the signal capacitors CS1 to CS3. On the other hand, with this modification, the fixed-pattern noise can be made less noticeable by using the signal capacitors CS1 to CS3 in an irregular order.

Figure 8:
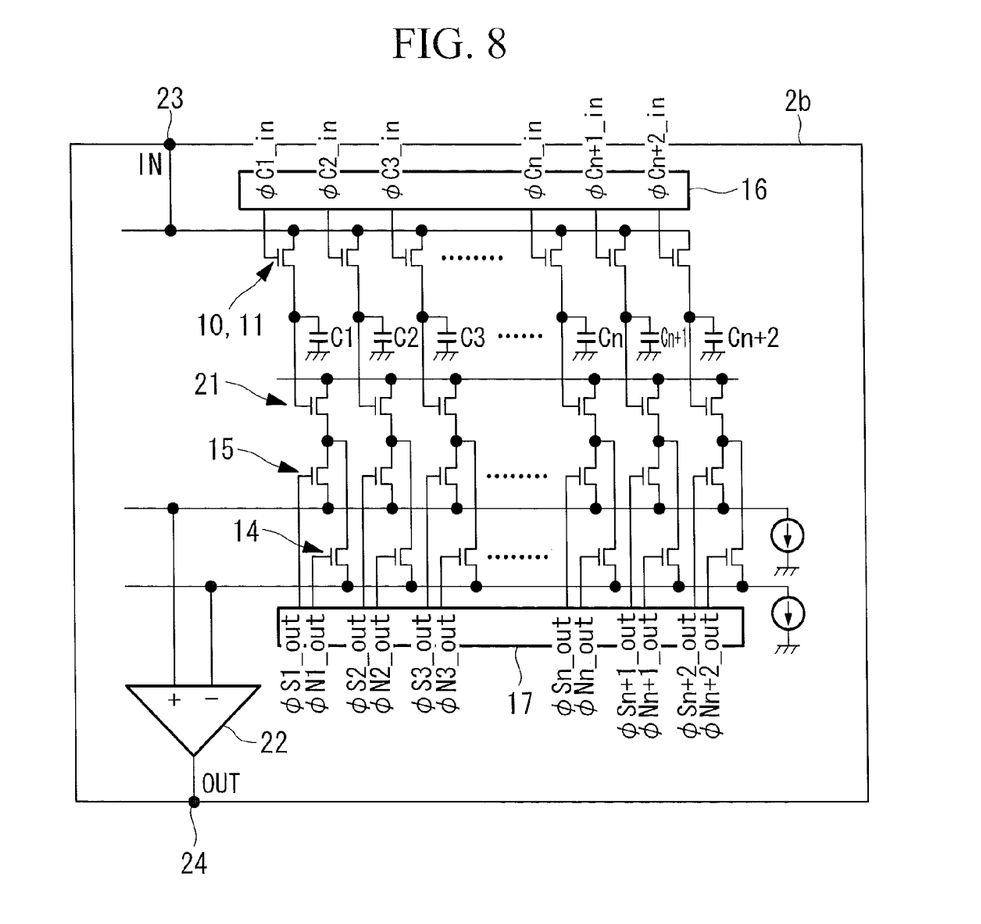
FIG. 8 is a plan view showing a partial configuration of a modification of the solid-state imaging device in FIG. 1, in which the signal capacitor and the noise capacitor are shared.

In addition, in this embodiment, although the capacitors C are used by dividing them between those for the noise voltage and those for the signal-plus-noise voltage, alternatively, as shown in FIG. 8, shared capacitors C1 to Cn+2 whose use is shared between that for the noise voltage and that for the signal-plus-noise voltage may be employed. In this configuration, the respective shared capacitors C1 to Cn+2 are connected to a first output terminal (inverting terminal (−) of the differential amplifier 22 in the case of the illustrated example) via the noise-outputting transistors 14, and are connected to a second output terminal (non-inverting terminal (+) of the differential amplifier 22 in the illustrated example) via the signal-outputting transistors 15. Note that the control circuit 18 is omitted from the illustration in FIG. 8.

Figure 9:
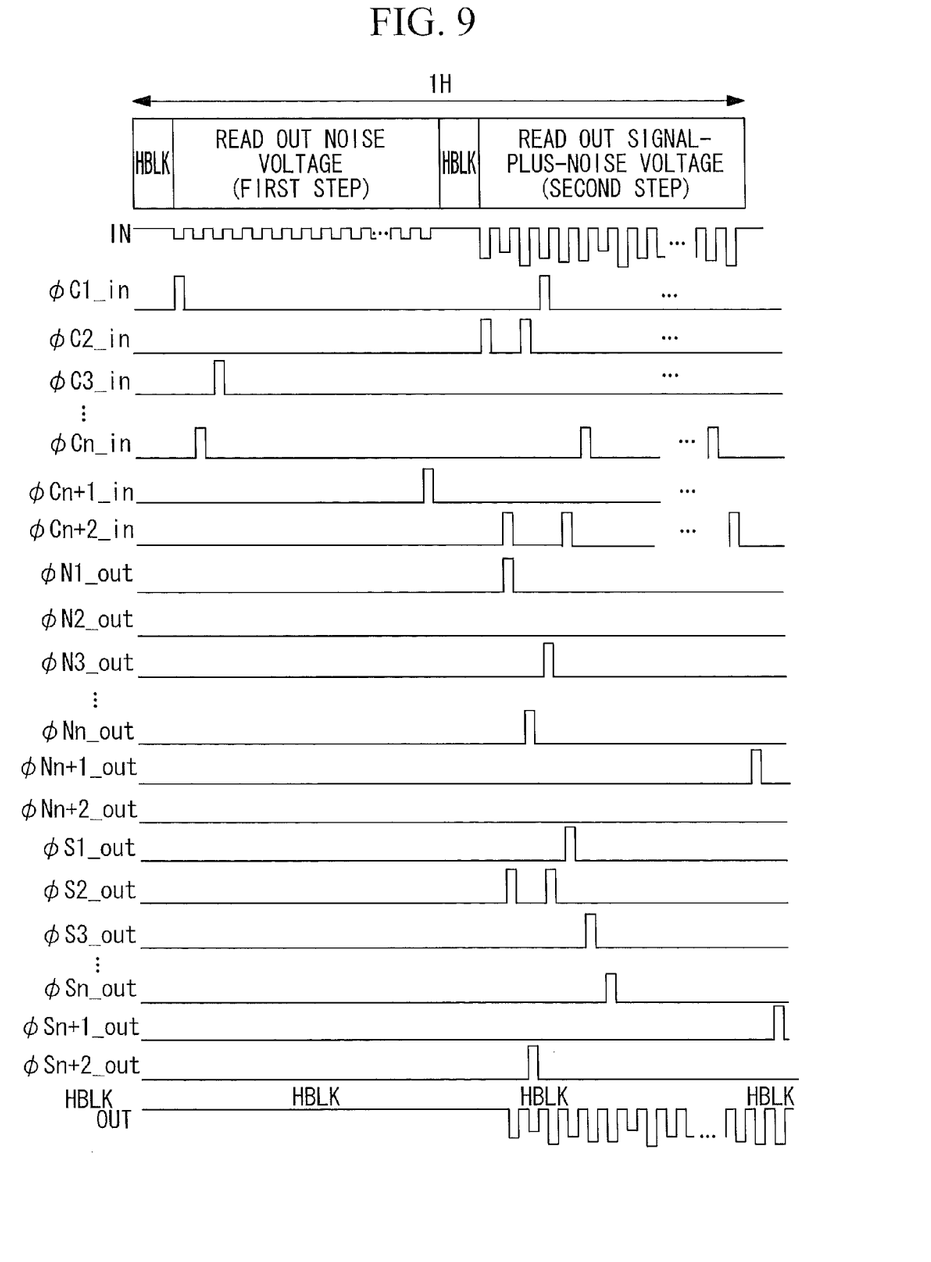
FIG. 9 is a timing chart showing the operation of the solid-state imaging device according to the modification in FIG. 8.

The thus-configured solid-state imaging device according to this modification can be operated as shown in FIG. 9. Specifically, in the first step, the noise voltages read out from the respective pixels 3 are input to arbitrary capacitors that are different from each other. The solid-state imaging device stores the association between the columns including the pixels 3 and the columns including the capacitors that retain the noise voltages from those pixels 3. At the point in time when the first step is completed, there are two capacitors (signal capacitors) that are not retaining the noise voltages.

In the second step, the solid-state imaging device inputs the signal-plus-noise voltages read out from the first two pixels 3 to the respective capacitors that are not retaining the noise voltages. Then, the noise voltages and the signal-plus-noise voltages from the same pixels 3 are output to the differential amplifier 22 from the capacitors at the same time. As reading out of the signal-plus-noise voltages progresses, there is an increasing number of empty capacitors that are not retaining the noise voltages. Therefore, the signal-plus-noise voltages read out from the third and subsequent pixels 3 can be retained in arbitrary capacitors among the empty capacitors.

Also with this modification configured in this way, it is possible to make the fixed-pattern noise that appears in an image less noticeable by selecting the capacitors that retain the noise voltages and the signal-plus-noise voltages in an irregular manner.

Note that, although FIG. 8 shows a configuration provided with n+2 capacitors, in this modification also, it suffices to provide as many capacitors as the number obtained by adding at least one to the number of the signal voltages that are read out while performing the first step once, and thus, it suffices to include at least n+1 capacitors.

In addition, in this embodiment, a shared-pixel architecture in which a plurality of pixels share a portion of the structure may be employed. Specifically, in the structure of the pixel 3 shown in FIG. 2, the amplifying transistor 34, the pixel-selecting transistor 35, and the resetting transistor 36 are shared by a plurality of pixels. In this configuration, the connection to the vertical signal lines 5 is made on the basis of pixel groups formed of the plurality of pixels sharing the same amplifying transistors 34, pixel-selecting transistors 35, and resetting transistors 36.

Figure 10:
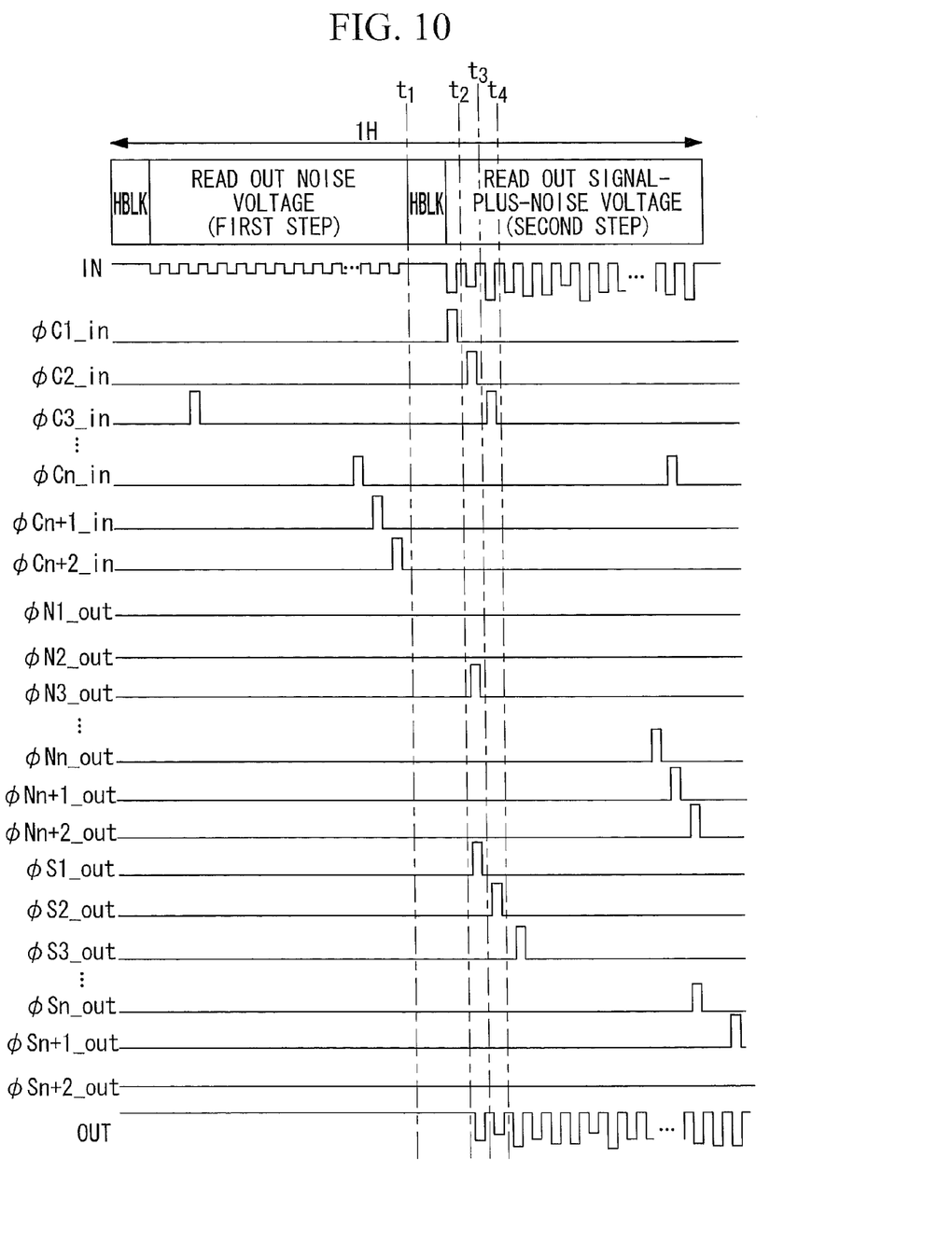
FIG. 10 is a timing chart showing another operation of the solid-state imaging device according to the modification in FIG. 8.

In addition, the configuration shown in FIG. 8 may also be operated as shown in FIG. 10. Specifically, as shown in FIG. 11(a) to (d), two adjacent capacitors may be used to read out the noise voltages and to read out the signal-plus-noise voltages.

Figure 11:
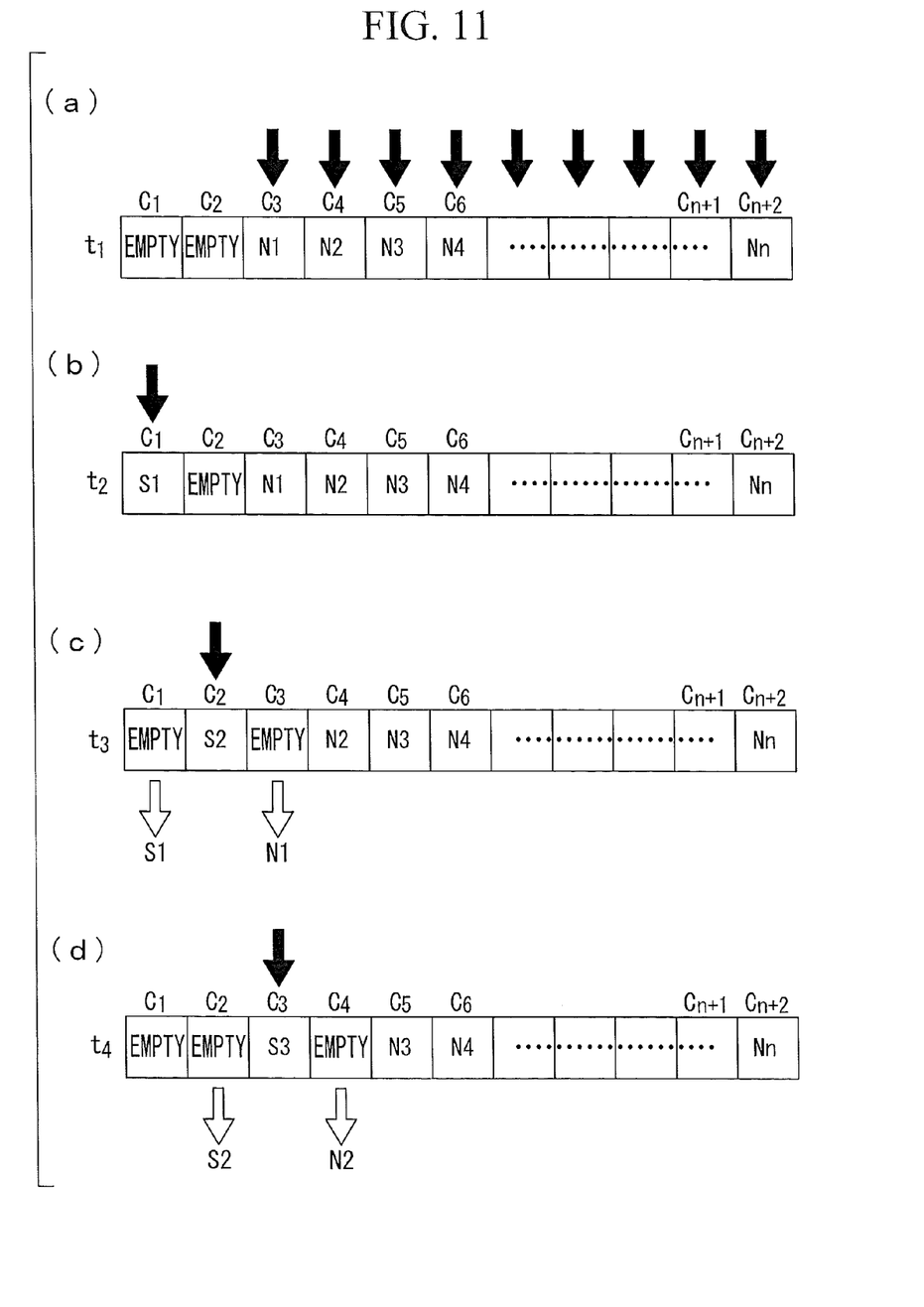

Manufacturing variability among the retaining circuits of the respective columns including the capacitors and the current amplifying transistors includes global variability related to semiconductor manufacturing processes (photolithography, etching, and so forth) due to increasing distances between elements. Specifically, as shown in FIGS. 10 and 11, by reading out the noise voltages and the signal-plus-noise voltages by sequentially using the retaining circuits of the respective columns that are disposed at positions in close proximity to each other, manufacturing variability among retaining circuits of the respective columns used to read out the noise voltages and the retaining circuits of the respective columns used to read out the signal-plus-noise voltages can be made extremely small, and thus, the fixed-pattern noise can be reduced even more.

In addition, in this embodiment, although the pixel array 4 formed of the pixel 3 in a matrix-like square arrangement has been described, the arrangement of the pixels 3 is not limited to this arrangement, and it can appropriately be changed. For example, this embodiment can be applied to a pixel array formed of the pixels 3 in a honeycomb arrangement.

REFERENCE SIGNS LIST 1 solid-state imaging device
2a circuit block, pixel array, and scanning portion
2b circuit block, noise-removal circuit portion
3 pixel 4 pixel array
5 vertical signal line (first transfer line)
6 column-selecting transistor (first switch)
7 horizontal signal line (second transfer line)
8 first scanning portion
9 second scanning portion
10 noise-inputting transistor (second switch)
11 signal-inputting transistor (second switch)
12 first output terminal
13 second output terminal
14 noise-outputting transistor (third switch)
15 signal-outputting transistor (third switch)
16 third scanning portion
17 fourth scanning portion
18 control circuit
19 constant-current-circuit element
20 amplified-signal outputting circuit
21 current amplifying transistor
22 differential amplifier
23 input terminal
24 output terminal
31 photodiode (photoelectric conversion element)
32 transfer transistor
33 floating diffusion (charge-voltage conversion element)
34 amplifying transistor
35 pixel-selecting transistor
36 resetting transistor
CSeven, CSodd, CS1 to CS3 capacitor, signal capacitor
CN1 to CNn capacitor, noise capacitor
C1 to Cn+2 capacitor, shared capacitor

The invention claimed is:

1. A solid-state-imaging device signal processing system that is connected to a pixel-array portion in which, among a plurality of two-dimensionally arranged pixel units that include photoelectric conversion elements that photoelectrically convert incident light and charge-voltage conversion elements that convert photoelectrically converted signal charges to voltages and that can separately output noise signals generated when resetting the charge-voltage conversion elements and signal-plus-noise signals in which signals generated due to the photoelectric conversion are added to the noise signals, a plurality of pixel groups are formed of one or more of the pixel units and respectively have shared connections to a plurality of first transfer lines that individually are connected in parallel to a second transfer line via first switches, and from which the noise signals and the signal-plus-noise signals are output in an alternating manner, each in a unit read-out number, via the a second transfer line, the solid-state-imaging device signal processing system comprising:

capacitors that are connected in parallel to the second transfer line and that are provided in a greater number than the unit read-out number;
second switches that are provided between the respective capacitors and the second transfer line;
third switches that selectively and simultaneously output signals retained in two capacitors among the capacitors; and
a control portion that controls the second and third switches,
wherein, in a specified read-out group formed of pixel groups in a number corresponding to the unit read-out number, the control portion performs a first step of repeating, for as many times as the unit read-out number, by switching the pixel groups and the capacitors, an operation in which the second switches are controlled so that noise signals output to the second transfer line from one of the pixel units in the pixel groups are transferred to and retained in one of the capacitors; and a second step of repeating, for as many times as the unit read-out number, by switching the pixel groups and the capacitors, an operation in which the second switches are controlled so that signal-plus-noise signals output to the second transfer line from one of the pixel units in the pixel groups are transferred to and retained in another one of the capacitors and in which the third switches are subsequently controlled so that one noise signal and one signal-plus-noise signal that have been output from the same pixel unit and retained in separate capacitors are output at the same time.

2. The solid-state-imaging device signal processing system according to claim 1,
wherein the capacitors include as many noise capacitors as the unit read-out number, as well as two or more signal capacitors, and
the control portion causes the noise signals output from the pixel units to be transferred to and retained in the noise capacitors in the first step, and also causes the signal-plus-noise signals output from as many different pixel units as the number of the signal capacitors to be transferred to and retained in different signal capacitors in the second step.

3. The solid-state-imaging device signal processing system according to claim 1,
wherein the capacitors include as many noise capacitors as the unit read-out number, as well as three or more signal capacitors, and
the control portion causes the noise signals output from the pixel units to be transferred to and retained in the noise capacitors in the first step, and also causes the signal-plus-noise signals output from as many different pixel units as the number of the signal capacitors to be randomly transferred to and retained in different signal capacitors in the second step.

4. The solid-state-imaging device signal processing system according to claim 1,
wherein the capacitors include as many shared capacitors as the unit read-out number, as well as one or more signal capacitors, and
the control portion causes the noise signals output from the pixel units to be transferred to and retained in the shared capacitors in the first step, and also causes the signal-plus-noise signals output from different pixel units in the number corresponding to a number obtained by adding one to the number of signal capacitors to be alternately transferred to and retained in any one of the signal capacitors and the shared capacitors that have output noise signals due to the immediately preceding operation of the third switches in the second step.

5. A solid-state imaging device comprising:
a solid-state-imaging device signal processing system according to claim 1; and
the pixel-array portion that is connected to the solid-state-imaging device signal processing system,
wherein the pixel-array portion is provided with
a plurality of two-dimensionally arranged pixel units that include photoelectric conversion elements that photoelectrically convert incident light and charge-voltage conversion elements that convert photoelectrically converted signal charges to voltages and that can separately output noise signals generated when resetting the charge-voltage conversion elements and signal-plus-noise signals in which signals generated due to the photoelectric conversion are added to the noise signals;

the plurality of first transfer lines whose connections thereto are shared among the plurality of pixel groups formed of one or more of the pixel units;

the first switches provided in the respective first transfer lines; and the second transfer line to which the respective first transfer lines are connected in parallel via the first switches.

6. The solid-state imaging device according to claim 5, wherein the pixel-array portion and a noise-removal circuit portion including the capacitors, the second switches, and the third switches are installed in different chips, and these chips are connected by the second transfer line.

* * * * *